United States Patent Office 3,262,786
Patented July 26, 1966

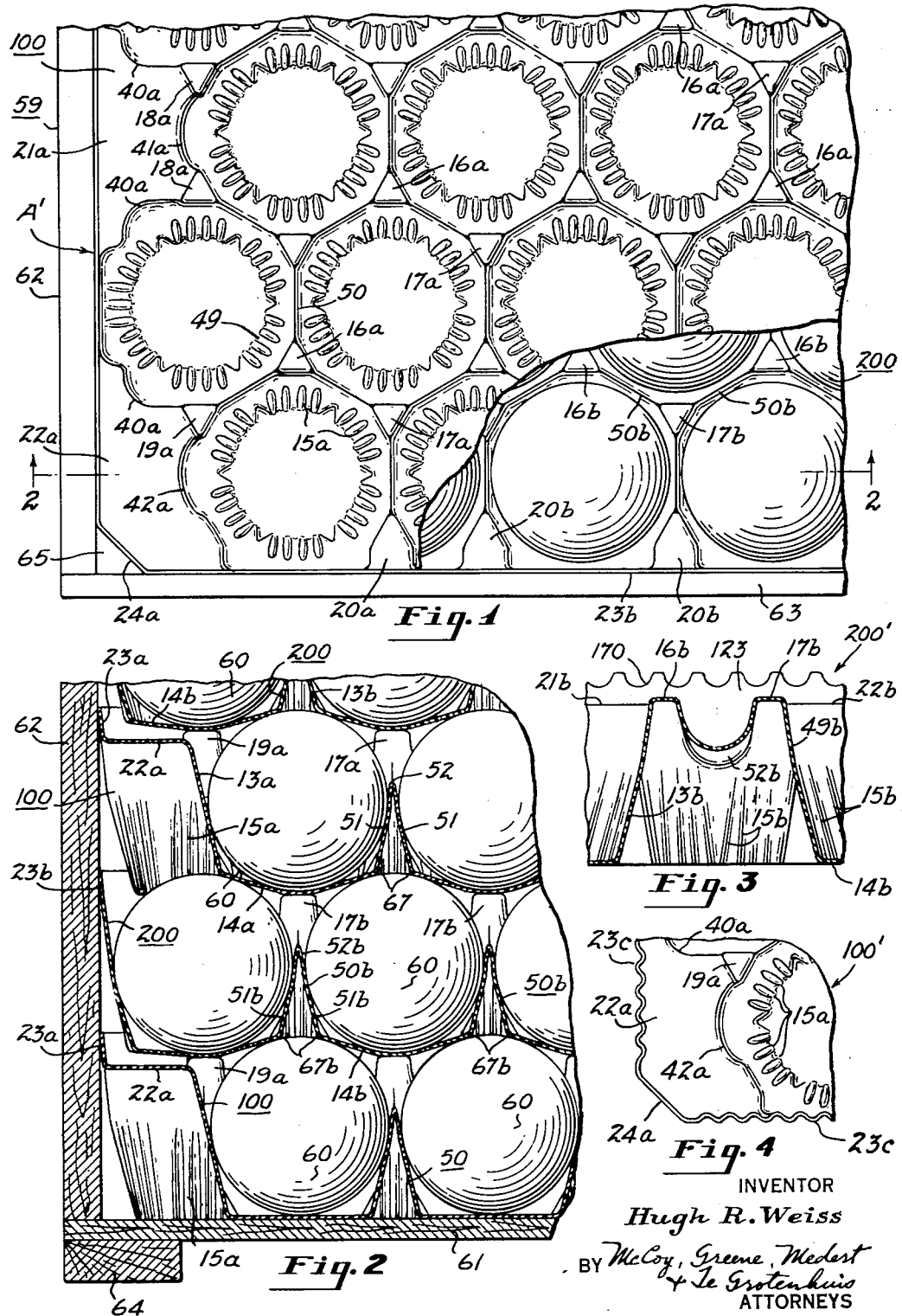

3,262,786
REVERSED STACKING TRAYS
Hugh R. Weiss, Montclair, N.J., assignor to The Pantasote Company, Passaic, N.J., a corporation of New Jersey
Filed Dec. 9, 1963, Ser. No. 329,202
2 Claims. (Cl. 99—171)

This application is a continuation-in-part of my copending application Serial No. 154,140, filed November 22, 1961, now Patent No. 3,143,237 and a continuation-in-part of my copending application Serial No. 140,375 filed September 25, 1961, and now Patent No. 3,171,562.

The present invention relates to multiple-compartment trays formed from thin sheets of synthetic resin material and more particularly to improved, one-piece, vacuum-molded, plastic fruit trays which provide maximum protection against damage to the fruit when the fruit is packed in a conventional fruit box or lug.

The trays of this invention are especially constructed for assembly into a conventional, rectangular, fruit lug or box made of wood or other suitable material. Each tray is provided with a continuous, low-height, upstanding, marginal wall or flange which fits snugly against the rough inner walls of the fruit lug and prevents the fruit in the marginal cups of the tray from contacting the rough surfaces of said inner walls. Such marginal wall or flange not only prevents undesirable shifting of the tray during handling the shipping but also stiffens and reinforces the tray and facilitates assembly of the tray in the fruit lug. Such flange also facilitates stacking of fruit in the trays for display purposes in a store.

According to this invention, two similar sets of trays are provided for each fruit lug. The trays are stacked so that the fruit in one tray does not contact the fruit in the next adjacent tray. This is preferably accomplished by providing left and right hand trays of the same size, one being the reverse of the other. Such reversed trays are constructed so that the fruit in every other tray is in vertical alignment, but the fruit in each tray is out of vertical alignment with and out of contact with the fruit in the next adjacent tray.

An object of the present invention is to provide a plastic tray which minimizes bruising and decay of perishable fruits and vegetables.

A further object of the invention is to provide a plastic tray which may readily be assembled in a conventional fruit lug or box.

Another object of the invention is to provide a tray which may be filled in a minimum period of time.

A further object of the invention is to eliminate the need for flat dividers between layers of fruit.

Other objects, uses and advantages of the invention will become apparent to those skilled in the art from the following description and claims and from the drawings in which:

FIGURE 1 is a fragmentary top view showing a fruit lug containing a series of trays made according to this invention, a portion of one tray being broken away to show the underlying tray with fruit therein;

FIGURE 2 is a fragmentary vertical sectional view taken substantially on the line 2—2 of FIGURE 1 and showing the lug loaded with fruit;

FIGURE 3 is a fragmentary longitudinal vertical sectional view through a pair of posts showing a modified form af tray 200' having a marginal flange with a scalloped edge; and FIGURE 4 is a fragmentary top view similar to FIGURE 1 showing another modified form of the invention.

In the drawings like parts are identified by the same numerals throughout the several views as in the parent application, now U.S. Patent No. 3,143,237.

The tray A' shown in the drawings, which is shown and described in detail in said U.S. Patent No. 3,143,237, is a 35-count fruit tray which may be former from a single sheet of polyvinyl chloride or other synthetic resin material like the tray described in said patent. The tray A' has 35 closely spaced cup-shaped portions (pockets) of generally circular (polygonal) horizontal cross section arranged in seven parallel lateral rows and in parallel diagonal rows inclined at an angle of 60 degrees relative to said lateral rows. The centers of the cups in each lateral row are regularly spaced apart the same distance as the centers of the cups in each diagonal row. Each cup has a tapered peripheral wall 13a, a flat bottom wall 14a, vertical pleats 15a, and six upwardly projecting hollow posts 16a and 17a (the parts of the tray A' corresponding to parts of the tray A of said Patent No. 3,143,237 are identified by the same numeral with the suffix added). The posts 16a and 17a have upper surfaces located substantially in a common horizontal plane parallel to the bottom walls of the cups and to the plane containing the upper edge of the marginal flange 23a.

One of the cups at the end of each lateral row is spaced from the margin of the tray and is integrally joined to the marginal flange by a ledge 21a or 22a having at least one wide, rounded notch therein forming continuations of radially outwardly projecting portions of the peripheral cup walls 13a. Such projecting portions form the vertical channels 40a which extend from the ledge to the bottom of the cup to facilitate radial expansion of the cup. Each ledge 21a has two channels 40a and a wider channel 41a which is located between the posts or projections 18a. The corner ledge 22a has one channel 40a adjacent the post 19a and a wider channel 42a between such posts and the end of the tray.

At the ends of the tray A' small ledges 20a are provided between adjacent cups. Such ledges would have the same height as the ledges 21a and 22a.

The marginal flange 23a has flat side and end portions of uniform width and beveled corner portions 24a to facilitate circulation of air at the corners of the rectangular fruit lug or box 59 in which the trays are placed. Thus, a narrow vertical air passage 65 of triangular cross section is formed at the corners of each tray between the flange 23a and the inner vertical walls 62 and 63 of the lug 59.

The posts 16a and 17a are tapered like the posts 16 and 17 and decrease in size in an upward direction. The posts have walls 49 (similar to walls 49b of FIGURE 3) which are provided with corrugations 15a extending from the bottom wall 14a more than half the height of the post to permit expansion of the lower portion of the cup. A partition 50 having diverging walls 51 is provided between each pair of adjacent posts to separate the fruit in adjacent cups of the tray. Each partition is preferably provided with a flat double-wall fin 52 similar to the fin 52b and having a crescent or moon-shape as best shown in FIGURE 3. Such fin separates the fruit in adjacent cups and reinforces the tray without reducing the amount of fruit which can be loaded into the tray.

The depth of each of the cups of the trays A' is the vertical distance from the bottom wall 14a to the top of the adjacent posts 16a or 17a, and is equal to the height of said posts.

Each post 16a or 17a projects vertically a substantial distance above the top central point of each partition 50. Such distance is less than half the height of the post and is usually 0.3 to 0.4 times the height of the post.

The trays of this invention may be stacked by placing the cups of one tray inside the cups of an adjacent tray to form a very small stack containing a large number of trays nested together. It is, therefore, easy to store the trays in a small space before they are used to package the fruit.

Prior to this invention it was necessary, in order to provide the fruit with adequate protection, to place a flat cardboard or chipboard sheet or other protective pad over the fruit in one tray of the fruit lug before inserting the next tray. The present invention eliminates the need for such protective pads because of the novel cooperation between adjacent fruit trays as shown, for example, in FIGURES 1 and 2.

The tray A′ and its inversion 200 are of a size to fit a standard rectangular wooden fruit lug 59 having a flat horizontal rectangular bottom wall 61, flat vertical rectangular side walls 62, flat vertical rectangular end walls 63 perpendicular to the walls 61 and 62, and spacer slats 64 carried by the wall 61. When the tray A′ is placed in the fruit lug, its upright marginal flange 23a rests against the rough inner vertical surfaces of the side and end walls 62 and 63 throughout the perimeter of the tray. If desired, such flange may be substantially parallel to or flush with said inner vertical surfaces. When the trays are filled with the fruit 60 and packed in the fruit lug 59, the marginal portions 67 of the bottom cup walls 14a engage the underlying pieces of fruit 60 to support the weight of the fruit and to hold the fruit in one tray out of contact with the fruit in the next adjacent tray as best shown in FIGURE 2.

The 35-count tray 200 of FIGURES 1 and 2 is preferably an exact inversion or antipodal copy of the tray 100 and coacts with the tray 100 to protect the fruit in one tray from damage due to pressure against fruit in the next adjacent tray. Thus, the ledge 21b and the ledge 22b of the tray 200 are located, respectively, near the bottom left corner and at the bottom right corner, when viewed from the top (as in FIGURE 9); and the centers of the cups or pockets of the tray 200 are located directly above the longitudinal partitions 50 joining adjacent pairs of posts 16a and 17a as is apparent from FIGURES 1 and 2. If desired the posts 16a, 17a, 18a and 19a of the tray 100 may be provided with sufficient height to engage the bottom walls 14b of the overlying tray 200 when such tray is filled with fruit, in which case the posts 16b, 17b, 18b, and 19b will engage and support the bottom walls 14a of an overlying tray 100 generally as shown in FIGURE 2.

As shown in the drawings, the one-piece molded plastic fruit trays 200 have cups with a tapered peripheral wall 13b and a bottom wall 14b, vertical pleats 15b, hollow tapered posts 16b and 17b, ledges 20b, 21b and 22b, an endless upright marginal flange 23b, and partitions 50b with diverging walls 51b and double-wall fins t2b. The parts of the tray 200 which are exact inversions of corresponding parts of the tray 100 are identified by the same numerals except that the suffix letter is "b" rather than "a."

The cups and posts of the trays 100 and 200 are located to provide the fruit with maximum protection. The centers of the cups of each lateral row of cups in the tray 100, for example, are located directly over the longitudinal partitions 50 of the corresponding row of cups in the tray 200 as shown in FIGURE 1, and are located along a straight line midway between the posts at opposite ends of said partitions. When the trays 100 and 200 are filled with fruit and stacked as in FIGURE 2, the bottom marginal portions 67 and 67b of the trays are deformed under the weight, but such portions separate each piece of fruit from the fruit in the next adjacent tray and provide the fruit with adequate protection.

It will be noted that the marginal flanges 23a and 23b project above the bottom walls of the overlying trays. This prevents the fruit in the marginal cups from contacting the rough inner wooden surface of the fruit lug 59 as pointed out previously. The marginal flanges also strengthen the tray and facilitates stacking on the tray prior to use.

The marginal flanges also facilitate display of the fruit for sale in a store. Thus, the trays 100 and 200 may be removed from the fruit lug 59 at the store and stacked with the fruit therein generally as in FIGURE 2 (but without support from the lug 59. The flanges 23a and 23b facilitate such stacking and assist in maintaining the rectangular shape of the trays when they are so stacked.

FIGURE 3 shows a modified form of the invention wherein the fruit tray has marginal flange 123 with a scalloped upper edge 170. The tray 200′ of this figure is exactly the same as the tray 200 except that the marginal flange is scalloped, the flange 123 being the same as the flange 23b except for the scallops at 170. It will be understood that such scallops may also be employed on the marginal flange 23a of the tray A′.

It is preferable to provide the trays of this invention with a scalloped upper edge similar to the edge 170 so that the marginal flange fits better against the inner surface of the fruit lug 59. The scalloped edge also makes it easier to slide the tray into the fruit lug 59. Such edge will hug the inner surface of the box even when the marginal flange is normally inclined substantially relative to the vertical. For best results, the scallops at 170 should extend vertically above one-third to about one-half the vertical width of the marginal flange.

The scalloped edge 170 is particularly advantageous when employing an inextensible marginal flange to strengthen the marginal portion of the tray.

FIGURE 4 shows another modified form of the invention wherein the fruit tray 100′ has a marginal flange 23c which is corrugated. The tray 100′ of this figure is exactly the same as the tray 100 except that the marginal flange is corrugated or provided with a sinuous shape throughout the length of each of the side and end portions of the flange. Thus, the corrugations extend the full distance between the corner portions 24a at each side and at each end of the tray. It will be understood, of course, that such corrugations may also be employed on the marginal flanges 23, 23a and 123 of the trays previously described.

FIGURE 4 shows the corner of the tray 100′ including the pleats 15a of the corner cup, the corner ledge 22a, the beveled corner portions 24a of the marginal flange 23c and the channels 40a and 42a at the margin of said ledge. Like the flanges 23a and 23b, the marginal flange 23c is narrow and has a uniform width throughout the perimeter of the tray, the corrugations extending the full width of the flange and preferably terminating at the level of the ledges 21a and 22a. The upper edge of the flange 23c is preferably located in a plane parallel to the bottom walls 14a of the cups, the height of said upper edge being preferably the same as that of the flanges 23a and 23b. While such upper edge is flat in the modification shown herein, it will be understood that the upper edge may be scalloped like the flange 123 throughout the length of the flange.

The corrugations enable the marginal flange to fit better against the inner surface of the fruit lug 59 and also makes it easier to slide the tray into the fruit lug. The corrugations also tend to cushion the fruit to prevent injury due to impact against the walls of the fruit lug.

While the drawings are substantially to scale, it will be understood that the thicknesses of the parts are not shown with precision. Because the trays are formed from flat plastic sheets of uniform thickness, the individual cups or pockets of the tray have walls which gradually decrease in thickness from the top to the bottom of the cup.

It will be understood that the above description is by way of illustration, rather than limitation, and that, in accordance with the provisions of the patent laws, variations and modifications of the specific devices shown or described herein may be made without departing from the spirit of the invention.

Having described my invention, I claim:

1. A fruit packing assembly for packing boxes comprising a series of multiple-compartment molded fruit packing trays filled with fruit and arranged in a stack with the fruit in each lower tray engaging and supporting the bottom portion of the overlying tray, each tray being formed in one piece from a thin sheet of thermoplastic material and having a generally rectangular perimeter, a continuous vertically disposed marginal reinforcing flange extending throughout the periphery of said tray and strengthening said tray, said flange having an upper cut edge, the bottom portion of said tray being provided with rows of downwardly extending cup-shaped pockets having thin lower side and bottom walls which conform with the fruit therein, each pocket containing an individual piece of fruit and fitting snugly the lower portion of said fruit, the pockets along the edges of the tray having portions of their outer walls contiguous to said marginal flange, the marginal flanges projecting upwardly above the bottom level of the cup-shaped pockets of overlying trays to limit horizontal movement of the overlying trays in all directions and to hold the trays in vertical alignment, said pockets being arranged in parallel longitudinal, lateral and diagonal rows and facing upwardly for engagement with the fruit therein, each tray having generally the same size and shape as the next adjacent tray of the stack but being an inversion of said adjacent tray, the center of each pocket in one tray being out of alignment with the centers of the pockets in the next adjacent tray and being spaced from a vertical line through the center of the nearest pocket of the adjacent tray a horizontal distance equal to about 0.4 to 0.5 times the maximum diameter of the latter pocket, the lower peripheral portions of the pockets of each tray providing cushioning means for engaging the underlying fruit and holding the fruit in that pocket away from the underlying fruit to prevent damage to the fruit.

2. A fruit packing assembly as defined in claim 1 wherein substantially the entire upper edge of said marginal flange is scalloped to make the flange fit better against the inner surface of the packing box and to facilitate sliding said tray into said box, the scallops being flat and extending vertically about ⅓ to about ½ the vertical width of said marginal flange.

References Cited by the Examiner

UNITED STATES PATENTS

| | | | |
|---|---|---|---|
| 2,078,927 | 5/1937 | Dorr | 217—26.5 |
| 3,143,237 | 8/1964 | Weiss | 217—26.5 |

FOREIGN PATENTS

| | | |
|---|---|---|
| 205,916 | 10/1959 | Austria. |
| 815,204 | 6/1959 | Great Britain. |
| 849,180 | 9/1960 | Great Britain. |
| 94,278 | 5/1960 | Netherlands. |

THERON E. CONDON, *Primary Examiner.*

HYMAN LORD, *Examiner.*